(12) United States Patent
McGrew, Jr. et al.

(10) Patent No.: US 9,381,799 B2
(45) Date of Patent: Jul. 5, 2016

(54) HYBRID VEHICLE INTERNAL COMBUSTION ENGINE

(71) Applicant: GM GLOBAL TECHNOLOGY OPERATIONS LLC, Detroit, MI (US)

(72) Inventors: Arthur L. McGrew, Jr., Indianapolis, IN (US); Gary R. Valler, Greenfield, IN (US)

(73) Assignee: GM Global Technology Operations LLC, Detroit, MI (US)

(*) Notice: Subject to any disclaimer, the term of this patent is extended or adjusted under 35 U.S.C. 154(b) by 129 days.

(21) Appl. No.: 14/189,507

(22) Filed: Feb. 25, 2014

(65) Prior Publication Data

US 2015/0239333 A1      Aug. 27, 2015

(51) Int. Cl.
| | |
|---|---|
| *F16D 65/14* | (2006.01) |
| *B60K 6/387* | (2007.10) |
| *F16D 11/10* | (2006.01) |
| *F16D 27/108* | (2006.01) |
| *B60K 6/48* | (2007.10) |
| *F16D 63/00* | (2006.01) |
| *B60T 1/06* | (2006.01) |
| *B60T 1/00* | (2006.01) |
| *F16H 63/34* | (2006.01) |

(52) U.S. Cl.
CPC . *B60K 6/387* (2013.01); *B60K 6/48* (2013.01); *B60T 1/005* (2013.01); *B60T 1/062* (2013.01); *F16D 11/10* (2013.01); *F16D 27/108* (2013.01); *F16D 63/00* (2013.01); *F16D 63/006* (2013.01); *B60K 2006/4808* (2013.01); *F16H 63/3441* (2013.01); *Y02T 10/6204* (2013.01); *Y02T 10/6282* (2013.01); *Y02T 10/6295* (2013.01); *Y02T 90/14* (2013.01); *Y10S 903/902* (2013.01)

(58) Field of Classification Search
CPC ................... B60K 2006/381; F16H 63/3475; F16H 63/3441
See application file for complete search history.

(56) References Cited

U.S. PATENT DOCUMENTS

| | | | | |
|---|---|---|---|---|
| 4,683,747 | A * | 8/1987 | Hall | F02B 77/087 73/114.64 |
| 5,954,179 | A * | 9/1999 | Osborn | B60T 1/005 192/219.5 |
| 8,053,691 | B2* | 11/2011 | Vernacchia | F61H 61/22 200/61.45 M |
| 2004/0187620 | A1* | 9/2004 | Newman | F16D 63/006 74/411.5 |

* cited by examiner

*Primary Examiner* — Robert Hodge
*Assistant Examiner* — Ryan Dodd
(74) *Attorney, Agent, or Firm* — Quinn Law Group, PLLC (57) ABSTRACT

An internal combustion engine for a hybrid vehicle includes an engine block, a flywheel, and a grounding clutch coupled to the block. The block defines a bore along a first longitudinal axis. The flywheel is rotatable about the axis and includes a spline. The spline has a first tooth and a second tooth spaced apart from the first tooth to define a gap therebetween. The clutch is configured for preventing rotation of the flywheel about the first axis and includes a locking pin. The pin is transitionable between a locked position in which the pin is disposed within the gap and abuts the first and second teeth such that the flywheel does not rotate, and an unlocked position in which the pin does not abut the first and second teeth such that the flywheel rotates. A hybrid vehicle is also disclosed.

9 Claims, 3 Drawing Sheets

Fig-6

HYBRID VEHICLE INTERNAL COMBUSTION ENGINE

TECHNICAL FIELD

The disclosure relates to internal combustion engines for hybrid vehicles.

BACKGROUND

Hybrid vehicles may be powered by more than one power source. For example, a hybrid electric vehicle may be powered by an internal combustion engine and one or more electric motors. During certain vehicle operating conditions, the internal combustion engine may be disabled so that the one or more electric motors may instead power the hybrid vehicle.

SUMMARY

An internal combustion engine for a hybrid vehicle includes an engine block defining a bore therethrough along a first longitudinal axis. The internal combustion engine also includes a flywheel rotatable about the first longitudinal axis and including a first spline. The first spline has a first tooth and a second tooth spaced apart from the first tooth to define a first gap therebetween. The internal combustion engine also includes a grounding clutch coupled to the engine block and configured for preventing rotation of the flywheel about the first longitudinal axis. The grounding clutch includes a locking pin transitionable between a locked position in which the locking pin is disposed within the first gap and abuts the first tooth and the second tooth such that the flywheel does not rotate about the first longitudinal axis, and an unlocked position in which the locking pin does not abut the first tooth and the second tooth such that the flywheel rotates about the first longitudinal axis.

In one embodiment, the second tooth is radially spaced apart from the first tooth about the first longitudinal axis. Further, the first tooth and the second tooth project away from the flywheel and the first longitudinal axis. In addition, the grounding clutch is not rotatable about the first longitudinal axis and includes a second spline and the locking pin. The second spline has a third tooth and a fourth tooth spaced apart from the third tooth to define a second gap therebetween, and the third tooth and the fourth tooth project toward the flywheel. The locking pin is transitionable between a locked position in which the locking pin is disposed within the first gap and the second gap and abuts the first tooth, the second tooth, the third tooth, and the fourth tooth such that the flywheel does not rotate about the first longitudinal axis, and an unlocked position in which the locking pin does not abut the first tooth and the second tooth such that the flywheel rotates about the first longitudinal axis.

A hybrid vehicle includes an internal combustion engine and a plurality of wheels each rotatable about an axle. The hybrid vehicle also includes an automatic transmission operable in an electric mode in which the internal combustion engine does not rotate the plurality of wheels about the axle. In addition, the hybrid vehicle includes an electric motor configured for rotating the plurality of wheels about the axle and operably connected to the automatic transmission. The internal combustion engine includes an engine block defining a bore therethrough along a first longitudinal axis and a flywheel rotatable about the first longitudinal axis. The flywheel includes a first spline having a first tooth and a second tooth spaced apart from the first tooth to define a first gap therebetween. The internal combustion engine also includes a grounding clutch coupled to the engine block and configured for preventing rotation of the flywheel about the first longitudinal axis when the automatic transmission operates in the electric mode. The grounding clutch includes a locking pin transitionable between a locked position in which the locking pin is disposed within the first gap and abuts the first tooth and the second tooth such that the flywheel does not rotate about the first longitudinal axis, and an unlocked position in which the locking pin does not abut the first tooth and the second tooth such that the flywheel rotates about the first longitudinal axis.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
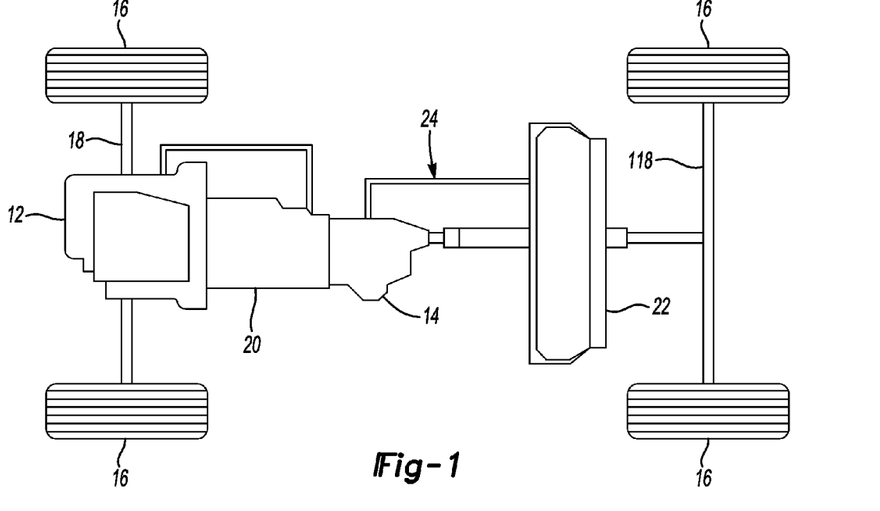
FIG. 1 is a schematic illustration of a plan view of a hybrid vehicle, wherein the hybrid vehicle includes an internal combustion engine, an automatic transmission, and an electric motor.

Referring to the Figures, wherein like reference numerals refer to like elements, a hybrid vehicle 10 including an internal combustion engine 12 is shown generally in FIG. 1. As used herein, the terminology "hybrid vehicle 10" refers to a vehicle that is powered by a first power source and a second power source that is different from the first power source. For example, the hybrid vehicle 10 may be powered by the internal combustion engine 12 and an electric motor 14. Therefore, the hybrid vehicle 10 may be a hybrid electric vehicle (HEV), a plug-in hybrid electric vehicle (PHEV), or an extended range electric vehicle (E-REV), and the internal combustion engine 12 may be useful for automotive vehicles including a passenger car or a sport utility vehicle. However, it is to be appreciated that the internal combustion engine 12 may also be useful for non-automotive applications such as marine and recreational vehicle applications.

Referring again to FIG. 1, the hybrid vehicle 10 includes a plurality of wheels 16 each rotatable about an axle 18, 118 and configured for translating the hybrid vehicle 10 across a surface. During operation of the hybrid vehicle 10, the plurality of wheels 16 may rotate about the axle 18, 118 such that the hybrid vehicle 10 travels along a road surface (not shown).

With continued reference to FIG. 1, the hybrid vehicle 10 also includes an automatic transmission 20 and the internal combustion engine 12 operably connected to the automatic transmission 20. For example, although not shown, a torque converter may directly operably connect the internal combustion engine 12 to the automatic transmission 20. However, in another arrangement, the electric motor 14 and/or a battery 22 may indirectly operably connect the internal combustion engine 12 to the automatic transmission 20. The automatic transmission 20 is not a manual transmission, but rather automatically shifts between a plurality of gear ratios (not shown) of the hybrid vehicle 10 according to a travel speed of the hybrid vehicle 10.

Further, the automatic transmission 20 is operable in an electric mode (represented generally at 24) in which the internal combustion engine 12 does not rotate the plurality of wheels 16 about the axle 18, 118. That is, when the automatic transmission 20 operates in electric mode 24, the internal combustion engine 12 may be temporarily disengaged or disabled so that the internal combustion engine 12 does not provide motive power directly to the plurality of wheels 16. Stated differently, when the automatic transmission 20 operates in electric mode 24, the internal combustion engine 12 may not provide motive power to the hybrid vehicle 10, i.e., may not directly impart motion to the plurality of wheels 16 via the automatic transmission 20.

Referring again to FIG. 1, the hybrid vehicle 10 also includes the electric motor 14 configured for rotating the plurality of wheels 16 about the axle 18, 118 and operably connected to the automatic transmission 20. For example, during certain vehicle operating conditions, the electric motor 14 may draw energy from the battery 22 so that the electric motor 14 may rotate the plurality of wheels 16 about the axle 18, 118 via the automatic transmission 20. In addition, under certain configurations, the electric motor 14 may also operate as a generator to produce electrical energy that may be stored in the battery 22.

Therefore, as further defined with continued reference to FIG. 1, the automatic transmission 20 may operate in the electric mode 24 during certain vehicle operating conditions. For example, the electric mode 24 may refer to an electric-only vehicle operating condition in which only the electric motor 14 and the battery 22 provide the motive power to the plurality of wheels 16 via the automatic transmission 20, i.e., only the electric motor 14 and the battery 22 operate the automatic transmission 20. As another example, the electric mode 24 may refer to an auto-stop vehicle operating condition in which the internal combustion engine 12 shuts off to conserve a fuel of the hybrid vehicle 10, e.g., when the hybrid vehicle 10 is stopped at a traffic signal. Further, the electric mode 24 may refer to an electric-assist vehicle operating condition in which both the internal combustion engine 12 and the electric motor 14 concurrently provide motive power to the plurality of wheels 16 via the automatic transmission 20, i.e., both the internal combustion engine 12 and the electric motor 14 operate the automatic transmission 20. Therefore, the electric mode 24 is contrasted with a non-electric mode (not shown) of the automatic transmission 20 in which the internal combustion engine 12 provides the motive power to rotate the plurality of wheels 16.

Moreover, the automatic transmission 20 may be arranged so that the electric motor 14 may exclusively operate the automatic transmission 20, the internal combustion engine 12 may exclusively operate the automatic transmission 20, or both the electric motor 14 and the internal combustion engine 12 may concurrently operate the automatic transmission 20 to rotate the plurality of wheels 16. For example, the automatic transmission 20 may be arranged so that the internal combustion engine 12 may recharge the battery 22 but may not operate the automatic transmission 20 to rotate the plurality of wheels 16.

Figure 2:
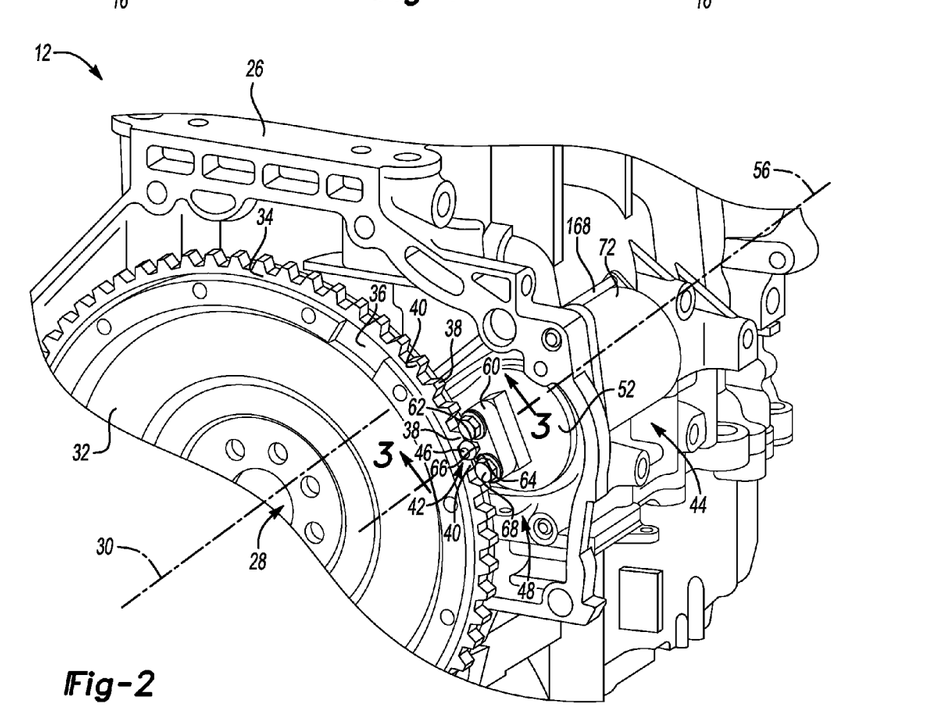
FIG. 2 is a schematic illustration of a partial, perspective, end view of the internal combustion engine of FIG. 1, wherein the internal combustion engine includes a grounding clutch.

Referring now to FIG. 2, the internal combustion engine 12 includes an engine block 26 defining a bore 28 (FIG. 3) therethrough along a first longitudinal axis 30. Although not shown, the engine block 26 may also define a plurality of cylinders in which a respective one of a plurality of pistons may reciprocate so that the internal combustion engine 12 may convert linear motion of the plurality of pistons to rotational motion along the driveshaft.

With continued reference to FIG. 2, the internal combustion engine 12 also includes a flywheel 32 rotatable about the first longitudinal axis 30 and including a first spline 34. In one embodiment, the flywheel 32 may be operably connected to the automatic transmission 20 and a torque converter (not shown). The first spline 34 may be characterized as an external spline, and may be attached to an exterior surface 36 (best shown in FIG. 6) of the flywheel 32. Further, the first spline 34 has a first tooth 38 and a second tooth 40 spaced apart from the first tooth 38 to define a first gap 42 therebetween. That is, the second tooth 40 may be radially spaced apart from the first tooth 38 about the first longitudinal axis 30 to define the first gap 42 between the first tooth 38 and the second tooth 40. Further, the first tooth 38 and the second tooth 40 may project away from the flywheel 32 and the first longitudinal axis 30 and define the first gap 42. In addition, the first spline 34 may include a plurality of first teeth 38 and a plurality of second teeth 40 each radially spaced apart from one another about the first longitudinal axis 30.

Figure 3:
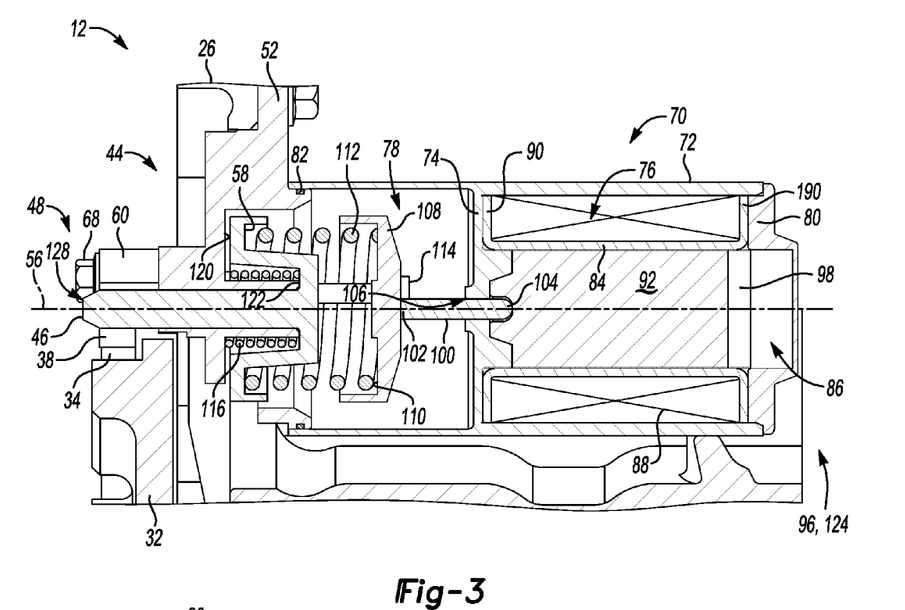
FIG. 3 is a schematic illustration of a cross-sectional view of the grounding clutch of FIG. 2 taken along section lines 3-3, wherein the grounding clutch includes a locking pin disposed in a locked position.
Figure 5:
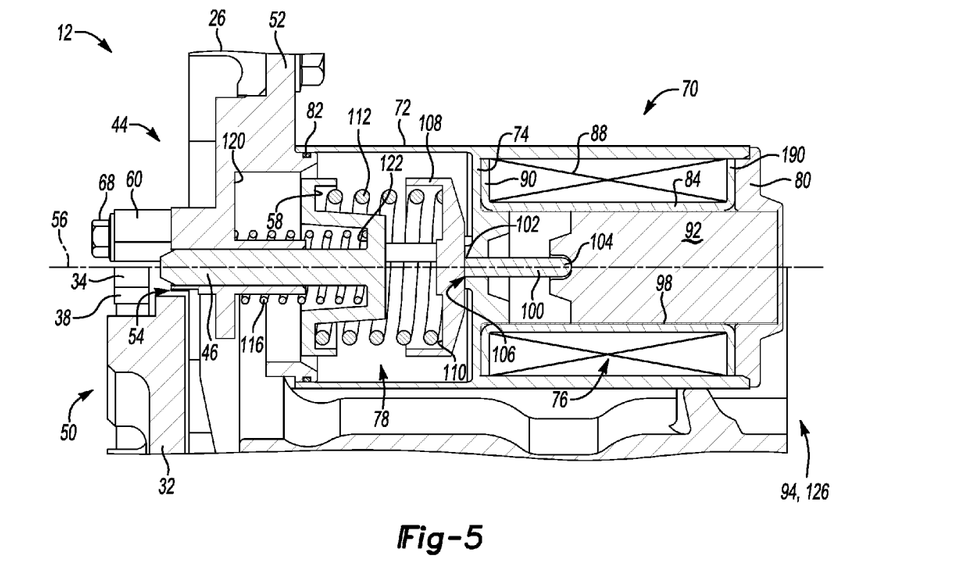
FIG. 5 is a schematic illustration of a cross-sectional view of the grounding clutch of FIG. 2, wherein the locking pin is disposed in an unlocked position.

Referring again to FIG. 2, the internal combustion engine 12 also includes a grounding clutch 44 coupled to the engine block 26 and configured for preventing rotation of the flywheel 32 about the first longitudinal axis 30 when the automatic transmission 20 (FIG. 1) operates in the electric mode 24 (FIG. 1). The grounding clutch 44 may be coupled to the engine block 26 in any manner. For example, as best shown in FIGS. 3 and 5, the grounding clutch 44 may be bolted to the engine block 26. As such, the grounding clutch 44 may not be rotatable about the first longitudinal axis 30, but may rather be fixed to the engine block 26. The grounding clutch 44 may be useful for preventing rotation of the flywheel 32 while the electric motor 14 provides motive power to the hybrid vehicle 10 (FIG. 1). Since the electric motor 14 may drive, i.e., provide motive power to, the hybrid vehicle 10 more efficiently when the internal combustion engine 12 is disabled or disengaged, e.g., when the flywheel 32 is stationary and does not rotate, the hybrid vehicle 10 including the grounding clutch 44 may have excellent efficiency. The grounding clutch 44 may be characterized as a coupling configured for connecting and disconnecting a driving component, i.e., flywheel 32 of the internal combustion engine 12, and a driven component, i.e., the automatic transmission 20.

More specifically, as described with reference to FIGS. 2-6, the grounding clutch 44 includes a locking pin 46 transitionable between a locked position 48 (FIGS. 2-4) in which the locking pin 46 is disposed within the first gap 42 and abuts the first tooth 38 (FIG. 2) and the second tooth 40 (FIG. 2) such that the flywheel 32 does not rotate about the first longitudinal axis 30 (FIG. 2), and an unlocked position 50 (FIGS. 5 and 6) in which the locking pin 46 does not abut the first tooth 38 and the second tooth 40 such that the flywheel 32 rotates about the first longitudinal axis 30. The locking pin 46 may therefore prevent rotation of the flywheel 32 about the first longitudinal axis 30 when the locking pin 46 is disposed in the locked position 48. Accordingly, the locking pin 46 may be formed from a suitably strong material such as steel.

Referring again to FIGS. 2-6, the grounding clutch 44 may further include a flange 52 attached to the engine block 26 and defining a channel 54 (FIG. 5) therethrough along a second longitudinal axis 56 that is substantially parallel to the first longitudinal axis 30. As used herein, the terminology "substantially" is used to represent the inherent degree of uncertainty that may be attributed to any quantitative comparison, value, measurement, or other representation. As such, it refers to an arrangement of elements or features that, while in theory would be expected to exhibit exact correspondence or behavior, may in practice embody something slightly less than exact. The term also represents the degree by which a quantitative representation may vary from a stated reference without resulting in a change in the basic function of the subject matter at issue. Therefore, it is contemplated that the first longitudinal axis 30 and the second longitudinal axis 56 may be slightly less than exactly parallel to one another.

Figure 4:
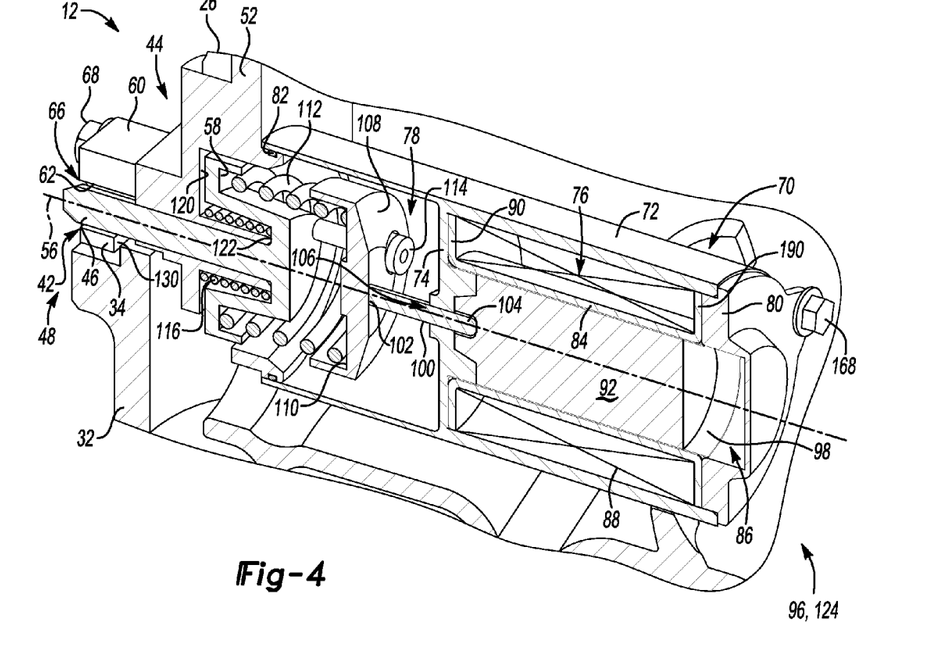
FIG. 4 is a schematic illustration of a cross-sectional perspective view of the grounding clutch of FIG. 3.
Figure 6:
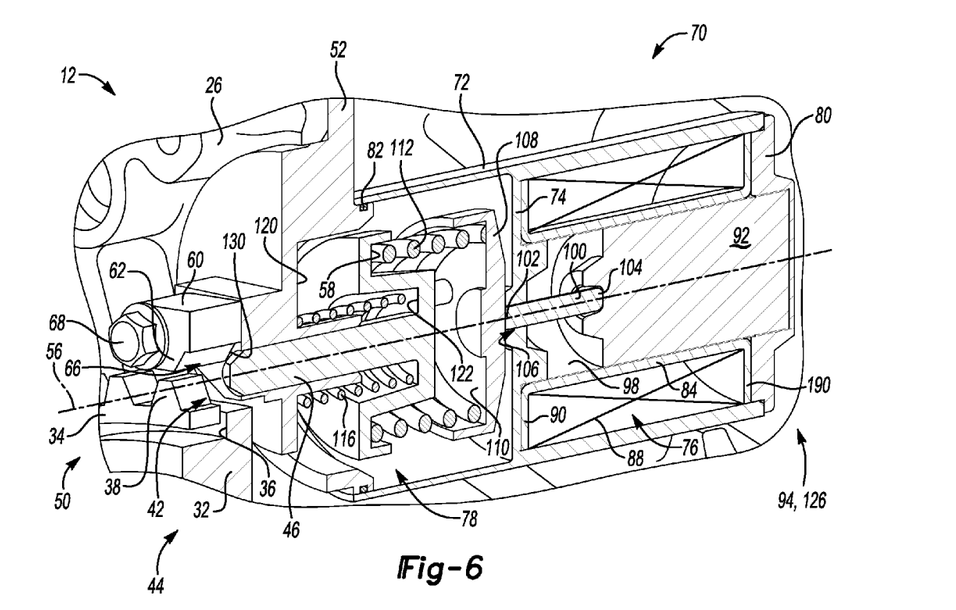
FIG. 6 is a schematic illustration of a cross-sectional perspective view of the grounding clutch of FIG. 5.

Referring to FIGS. 2-6, the flange 52 may be attached to the engine block 26 in any manner. The flange 52 may define the channel 54, and the locking pin 46 may be translatable along the second longitudinal axis 56 within the channel 54 as the locking pin transitions between the locked position 48 (FIGS. 2-4) and the unlocked position 50 (FIGS. 5 and 6). As best shown in FIG. 4, the locking pin 46 may also include a first seating surface 58 that is substantially perpendicular to the second longitudinal axis 56.

As best shown in FIG. 2, the grounding clutch 44 further includes a second spline 60 having a third tooth 62 and a fourth tooth 64 spaced apart from the third tooth 62 to define a second gap 66 therebetween. In particular, the third tooth 62 and the fourth tooth 64 may project towards the flywheel 32 and the first longitudinal axis 30. That is, the first spline 34 and the second spline 60 may be disposed in the same plane, and may be coaxial with the first longitudinal axis 30. In addition, the second spline 60 may be characterized as an internal spline and may not be rotatable about the first longitudinal axis 30. For example, the second spline 60 may be fixed to the flange 52 by a plurality of bolts 68. As such, as described with reference to FIGS. 4 and 6, as the locking pin 46 translates within the channel 54 from the unlocked position 50 (FIG. 6) to the locked position 48 (FIG. 4), the locking pin 46 may be disposed within the second gap 66 and may abut the third tooth 62 and the fourth tooth 64 when the locking pin 46 is disposed in the locked position 48. Conversely, the locking pin 46 may not abut the third tooth 62 and the fourth tooth 64 when the locking pin 46 is disposed in the unlocked position 50.

Referring now to FIGS. 3-6, the grounding clutch 44 may further include a solenoid 70. In particular, the solenoid 70 may include a housing 72 including a dividing member 74 and defining a first chamber 76 and a second chamber 78 spaced apart from the first chamber 76 by the dividing member 74. The housing 72 may include an end cap 80 spaced apart from the dividing member 74. The end cap 80 may be characterized as a removable portion of the housing 72 so that the solenoid 70 may be, for example, maintained, repaired, or adjusted. The housing 72 may be coupled to the flange 52, e.g., by a plurality of bolts 168 (FIG. 4), and may seal against the flange 52. As such, the grounding clutch 44 may further include a seal 82, e.g., an elastomeric O-ring seal, disposed between the flange 52 and the housing 72 and spaced apart from the dividing member 74.

With continued reference to FIGS. 3-6, the solenoid 70 may also include a bobbin 84 disposed within the first chamber 76 and defining an internal cavity 86 (FIGS. 3 and 4). In addition, the solenoid 70 may include a coil (represented generally at 88) disposed on and wound about the bobbin 84 and configured for inducing a magnetic flux. The bobbin 84 may provide an annular support for the coil 88 and may be formed from any suitable non-magnetic material known in the art. For example, the bobbin 84 may be formed from molded plastic, such as a thermoplastic. The bobbin 84 may also include one or more flanges 90, 190 for supporting the coil 88.

The coil 88 may be formed from an electrically-conductive material. For example, the coil 88 may be formed from copper wire. The coil 88 may be wound around the bobbin 84 in one or more turns, i.e., windings. In use, an electrical current may be applied to the coil 88 from a power source, such as, for example, a controller of a powertrain (not shown) or the battery 22 (FIG. 1), to induce the magnetic flux.

Referring again to FIGS. 3-6, the solenoid 70 also includes a plunger 92 translatable along the second longitudinal axis 56 within the internal cavity 86 (FIGS. 3 and 4). More specifically, the plunger 92 may shuttle between a non-energized position 94 (FIGS. 5 and 6) in which the plunger 92 abuts the end cap 80 of the housing 72 when the locking pin 46 is disposed in the unlocked position 50, and an energized position 96 (FIGS. 3 and 4) in which the plunger 92 abuts the dividing member 74. The plunger 92 may be formed from a magnetic material such as iron or steel. Therefore, as electrical current is applied to the coil 88, magnetic flux is induced and the plunger 92 is pulled to the energized position 96. Conversely, when no electrical current is applied to the coil 88, the plunger 92 may return to the non-energized position 94. To ensure that the plunger 92 translates freely within the internal cavity 86, the solenoid 70 may further include a sleeve 98 formed from, for example, copper or brass, and disposed against the bobbin 84 and dividing member 74. That is, the sleeve 98 may line the internal cavity 86.

As described with continued reference to FIGS. 3-6, the grounding clutch 44 may further include a rod 100 extending between the first chamber 76 and the second chamber 78 and abuttable with the plunger 92. The rod 100 may be configured for interconnecting the plunger 92 and the locking pin 46 and for transferring the linear motion of the plunger 92 to the locking pin 46 as the plunger 92 transitions between the non-energized position 94 (FIGS. 5 and 6) and the energized position 96 (FIGS. 3 and 4), and as the locking pin 46 transitions between the unlocked position 50 (FIGS. 5 and 6) and the locked position 48 (FIGS. 2-4). The rod 100 may be magnetically isolated from the solenoid 70 and the plunger 92, and therefore may be formed from a non-magnetic material such as aluminum. The rod 100 may not be fixed at either end 102, 104, but may rather freely translate through the dividing member 74 within the first chamber 76 and the second chamber 78. That is, the rod 100 may not be attached to the plunger 92. Rather, the dividing member 74 may define a void 106 therethrough, and the rod 100 may bisect and freely travel through the void 106 as the locking pin 46 transitions between the locked position 48 and the unlocked position 50.

The grounding clutch 44 may further include a seat 108 abuttable with the rod 100 and disposed within the second chamber 78. The seat 108 may not be affixed to the rod 100, but rather the rod 100 may abut the seat 108 as the rod 100 translates through the void 106 and the plunger 92 shuttles within the internal cavity 86 along the second longitudinal axis 56. The seat 108 may have a second seating surface 110 that is substantially perpendicular to the second longitudinal axis 56 and substantially parallel to the first seating surface 58.

Referring to FIGS. 3 and 5, the grounding clutch 44 may further include a first resilient member 112 disposed along the second longitudinal axis 56, and disposed between and attached to the first seating surface 58 and the second seating surface 110. That is, the first resilient member 112 may be a first coiled spring and may be disposed between and in contact with the locking pin 46 and the seat 108. The first resilient member 112 may be preloaded or pre-compressed to a suitable degree. Therefore, the grounding clutch 44 may include a pretensioner 114 (FIG. 4), such as a button head shoulder bolt. More specifically, the pretensioner 114 may extend through the seat 108, threadably attach to the locking pin 46, and compress the first resilient member 112 to a desired preload.

With continued reference to FIGS. 3 and 5, the grounding clutch 44 may further include a second resilient member 116 disposed along the second longitudinal axis 56. The second resilient member 116 may also be a coiled spring, and may be coaxial with the first resilient member 112 along the second longitudinal axis 56. For example, the flange 52 may have a first working surface 120 and the locking pin 46 may have a second working surface 122 that is spaced apart from the first working surface 120 and the first seating surface 58. The second resilient member 116 may be disposed between and attached to the first working surface 120 and the second working surface 122 along the second longitudinal axis 56.

The second resilient member 116 may be configured to return the locking pin 46 to the unlocked position 50 (FIGS. 5 and 6) and to return the plunger 92 to the non-energized position 94 (FIGS. 5 and 6). That is, the second resilient member 116 may be characterized as a return spring. In operation, when the solenoid 70 is de-energized, i.e., when electrical current is not supplied to the coil 88, the second resilient member 116 may translate the locking pin 46 away from the flange 52 and therefore return the plunger to the non-energized position 94 in which the plunger 92 abuts the end cap 80. Conversely, when the solenoid 70 is energized, i.e., when electrical current is supplied to the coil 88, the plunger 92 may translate towards the flange 52, push against the rod 100, and overcome a spring force of the second resilient member 116 to translate the locking pin 46 to the locked position 48 (FIGS. 2-4).

That is, as further described by comparing FIGS. 3 and 5, the solenoid 70 may be transitionable between an energized state 124 (FIG. 3) in which the plunger 92, the rod 100, and the seat 108 translate together along the second longitudinal axis 56 toward the flange 52 such that the plunger 92 abuts the dividing member 74 to thereby transition the locking pin 46 from the unlocked position 50 (FIGS. 5 and 6) to the locked position 48 (FIGS. 3 and 4), and a non-energized state 126 (FIG. 5) in which the second resilient member 116 decompresses and extends along the second longitudinal axis 56 against the second working surface 122 to translate the seat 108, the rod 100, and the plunger 92 away from the flange 52 and thereby transition the locking pin 46 from the locked position 48 (FIGS. 2-4) to the unlocked position 50 (FIGS. 5 and 6). Stated differently, the solenoid 70 may be disposed in the energized state 124 as electrical current is supplied to the coil 88, and may be disposed in the non-energized state 126 when electrical current is not supplied to the coil 88. Generally, the grounding clutch 44 may have a stroke length, i.e., a distance between a distal end 128 (FIGS. 3 and 4) of the locking pin 46 when the locking pin 46 is disposed in the unlocked position 50 and the distal end 128 of the locking pin 46 when the locking pin 46 is disposed in the locked position 48, of from about 10 mm to about 20 mm, e.g., about 15 mm or about 17 mm.

Therefore, as described with reference to FIGS. 1-6, in operation, the flywheel 32 and the first spline 34 may continuously rotate about the first longitudinal axis 30. During a vehicle operating condition in which is it desirable to disable or shut down the internal combustion engine 12 (FIG. 1), e.g., when the automatic transmission 20 (FIG. 1) operates in electric mode 24 (FIG. 1), electrical current may be supplied to the coil 88 to thereby transition the plunger 92 to the energized position 96 (FIGS. 3 and 4). The plunger 92 may then push the rod 100 against the seat 108, which may push the second working surface 122 towards the flange 52. Referring to FIGS. 2-4, if the flywheel 32 rotates into a position in which the first gap 42 is aligned with the second gap 66, i.e., a non-tooth butt condition, then the locking pin 46 may be free to translate into the locked position 48 so that the locking pin 46 is disposed within the first gap 42 and the second gap 66, and abuts the first tooth 38 (FIG. 2), the second tooth 40 (FIG. 2), the third tooth 62 (FIG. 2), and the fourth tooth 64 (FIG. 2) such that the flywheel 32 does not rotate about the first longitudinal axis 30.

That is, as more specifically described with reference to FIG. 4, during the non-tooth butt condition, the second resilient member 116 may compress along the second longitudinal axis 56, and the first resilient member 112 may not compress along the second longitudinal axis 56, as the solenoid 70 transitions to the energized state 124 and the locking pin 46 transitions to the locked position 48.

However, although not shown, under some operating conditions, the locking pin 46 may encounter a tooth butt condition. For example, during operation, if the flywheel 32 rotates into a position in which the first gap 42 is not aligned with the second gap 66, i.e., a condition in which the locking pin 46 may abut a rear surface 130 (FIG. 6) of one of the first tooth 38 and the second tooth 40, the locking pin 46 may not be free to translate along the second longitudinal axis 56 into the locked position 48. That is, the locking pin 46 may abut the rear surface 130 and ratchet away from the one of the first tooth 38 and the second tooth 40. In this condition, the first resilient member 112 may compress along the second longitudinal axis 56 when the locking pin 46 abuts one of the first tooth 38 and the second tooth 40 and is not disposed within the first gap 42, to thereby translate the locking pin 46 away from the one of the first tooth 38 and the second tooth 40 and dispose the plunger 92 in contact with the dividing member 74. That is, the first resilient member 112 may only compress or change length along the second longitudinal axis 56 during the tooth butt condition, i.e., when the locking pin 46 attempts to translate into the first gap 42 but is restricted by the rear surface 130 of one of the first tooth 38 and the second tooth 40.

Such compression of the first resilient member 112 may allow the plunger 92 to fully actuate, i.e., fully abut the dividing member 74 during the tooth butt condition, which may in turn allow the electrical current to decrease. Since continuous electrical current supply to the coil 88 may unsuitably load and/or prematurely drain the battery 22 (FIG. 1), the first resilient member 112 may compensate for the tooth butt condition by allowing the locking pin 46 to engage when the flywheel 32 rotates sufficiently to once again align the first gap 42 and the second gap 66. Once the first gap 42 is sufficiently aligned with the second gap 66, the locking pin 46 may then translate away from the dividing member 74 towards the flywheel 32 to transition to the locked position 48 (FIGS. 2-4) so that the flywheel 32 does not rotate about the first longitudinal axis 30.

Therefore, a method of disabling or shutting down the internal combustion engine 12 (FIG. 1) for the hybrid vehicle 10 (FIG. 1) includes activating the grounding clutch 44 coupled to the engine block 26. Activating may include, for example, supplying electrical current to the coil 88. The method further includes transitioning the locking pin 46 from the unlocked position 50 (FIGS. 5 and 6) to the locked position 48 (FIGS. 3 and 4), and preventing rotation of the flywheel 32 about the first longitudinal axis 30 to thereby disable or shut down the internal combustion engine 12.

For the method, transitioning may include translating the plunger 92 from the non-energized position 94 (FIGS. 5 and 6) to the energized position 96 (FIGS. 3 and 4) to thereby abut the rod 100. Transitioning may also include pushing the rod 100 against the seat 108 and compressing the second resilient member 116 against the first working surface 120 to thereby dispose the locking pin 46 within the first gap 42 and the second gap 66.

During certain operating conditions, e.g., during the tooth butt condition, transitioning may further include ratcheting the distal end 128 of the locking pin 46 away from the rear surface 130 by compressing the first resilient member 112 along the second longitudinal axis 56. Therefore, the method may further include, after ratcheting, re-compressing the second resilient member 116 along the second longitudinal axis 56 to dispose the locking pin 46 within the first gap 42 and the second gap 66.

Advantageously, the grounding clutch 44 may be both serviceable and economical to install and operate. The grounding clutch 44 may be positioned to occupy a space on the engine block 26 vacated by a non-existent starter mechanism (not shown) for the internal combustion engine 12. That is, since the hybrid vehicle 10 may not include a conventional starter mechanism for the internal combustion engine 12, the grounding clutch 44 may be disposed in a location that would be otherwise occupied by the starter mechanism. As such, the grounding clutch 44 may not unsuitably load a main engine bearing (not shown) of the internal combustion engine 12. Further, since the grounding clutch 44 is self-contained and easily installed in the hybrid vehicle 10, the grounding clutch 44 is cost-effective.

In addition, since the grounding clutch 44 may lock-up or disable the internal combustion engine 12 (FIG. 1) during certain vehicle operating conditions, e.g., when the automatic transmission 20 (FIG. 1) operates in electric mode 24 (FIG. 1) and comparatively small electrical current is supplied to the coil 88, the hybrid vehicle 10 and internal combustion engine 12 have excellent efficiency and may not unsuitably impact a driving range, battery size, battery life, and/or consumer cost of the hybrid vehicle 10. In addition, since the grounding clutch 44 is configured to prevent rotation of the flywheel 32 when the locking pin 46 is disposed in the locked position 48 (FIGS. 2-4), it is not necessary to use the electric motor 14 (FIG. 1) to counteract continuous rotation of the flywheel 32 when the automatic transmission 20 (FIG. 1) operates in electric mode 24. Therefore, reliance on the comparatively small electrical current supplied to the coil 88 to actuate the grounding clutch 44 rather than reliance on a comparatively large electrical current necessary to operate and control the electric motor 14 provides the hybrid vehicle 10 with excellent energy efficiency during operation.

In addition, since a force required to translate the locking pin 46 to the locked position 48 (FIGS. 2-4) and thereby stop rotation of the flywheel 32 is comparatively small as compared to disabling the internal combustion engine 12 via wet disc clutches (not shown), the grounding clutch 44 is robust and reliable. Further, since the grounding clutch 44 is attached to the engine block 26 rather than the automatic transmission 20 (FIG. 1), the grounding clutch 44 does not contribute to spin losses or air drag losses as the locking pin 46 transitions to the locked position 48, which also contributes to the excellent energy efficiency of the hybrid vehicle 10.

While the best modes for carrying out the disclosure have been described in detail, those familiar with the art to which this disclosure relates will recognize various alternative designs and embodiments for practicing the disclosure within the scope of the appended claims.

The invention claimed is:

1. An internal combustion engine for a hybrid vehicle, the internal combustion engine comprising:
   an engine block defining a bore therethrough along a first longitudinal axis;
   a flywheel rotatable about the first longitudinal axis and including a first spline, wherein the first spline has a first tooth and a second tooth spaced apart from the first tooth to define a first gap therebetween; and
   a grounding clutch coupled to the engine block and configured for preventing rotation of the flywheel about the first longitudinal axis, wherein the grounding clutch includes:
      a locking pin transitionable between a locked position in which the locking pin is disposed within the first gap and abuts the first tooth and the second tooth such that the flywheel does not rotate about the first longitudinal axis, and an unlocked position in which the locking pin does not abut the first tooth and the second tooth such that the flywheel rotates about the first longitudinal axis;
      wherein the locking pin includes a first seating surface that is substantially perpendicular to the second longitudinal axis;
      a second spline having a third tooth and a fourth tooth spaced apart from the third tooth to define a second gap therebetween;
      a flange attached to the engine block and defining a channel therethrough along a second longitudinal axis that is substantially parallel to the first longitudinal axis;
      wherein the flange has a first working surface and the locking pin has a second working surface that is spaced apart from the first working surface and the first seating surface;
      a solenoid attached to the flange, wherein the solenoid includes:
         a housing including a dividing member and defining a first chamber and a second chamber spaced apart from the first chamber by the dividing member;
         a bobbin disposed within the first chamber and defining an internal cavity;
         a coil disposed on and wound about the bobbin; and
         a plunger translatable along the second longitudinal axis within the internal cavity;
      a rod extending between the first chamber and the second chamber and abuttable with the plunger;
      a seat abuttable with the rod and disposed within the second chamber, wherein the seat has a second seating surface that is substantially perpendicular to the second longitudinal axis and substantially parallel to the first seating surface;
      a first resilient member disposed along the second longitudinal axis and disposed between and attached to the first seating surface and the second seating surface; and
      a second resilient member disposed along the second longitudinal axis;
      wherein the second resilient member is disposed between and attached to the first working surface and the second working surface along the second longitudinal axis.

2. The internal combustion engine of claim 1, wherein the solenoid is transitionable between:
an energized state in which the plunger, the rod, and the seat translate together along the second longitudinal axis toward the flange such that the plunger abuts the dividing member to thereby transition the locking pin from the unlocked position to the locked position; and
a non-energized state in which the second resilient member decompresses and extends along the second longitudinal axis against the second working surface to translate the seat, the rod, and the plunger away from the flange and thereby transition the locking pin from the locked position to the unlocked position.

3. The internal combustion engine of claim 1, wherein the locking pin does not abut the third tooth and the fourth tooth when the locking pin is disposed in the unlocked position.

4. The internal combustion engine of claim 1, wherein the locking pin is translatable along the second longitudinal axis within the channel as the locking pin transitions between the locked position and the unlocked position.

5. The internal combustion engine of claim 2, wherein the second resilient member compresses along the second longitudinal axis and the first resilient member does not compress along the second longitudinal axis as the solenoid transitions to the energized state and the locking pin transitions to the locked position.

6. The internal combustion engine of claim 2, wherein the first resilient member compresses along the second longitudinal axis when the locking pin abuts one of the first tooth and the second tooth and is not disposed within the first gap to thereby translate the locking pin away from the one of the first tooth and the second tooth and dispose the plunger in contact with the dividing member.

7. The internal combustion engine of claim 2, wherein the grounding clutch is not rotatable about the first longitudinal axis.

8. An internal combustion engine for a hybrid vehicle, the internal combustion engine comprising:
an engine block defining a bore therethrough along a first longitudinal axis;
a flywheel rotatable about the first longitudinal axis and including a first spline; wherein the first spline has a first tooth and a second tooth radially spaced apart from the first tooth about the first longitudinal axis to define a first gap between the first tooth and the second tooth, wherein the first tooth and the second tooth project away from the flywheel and the first longitudinal axis; and
a grounding clutch coupled to the engine block and configured for preventing rotation of the flywheel about the first longitudinal axis, wherein the grounding clutch is not rotatable about the first longitudinal axis and includes:
a second spline having a third tooth and a fourth tooth spaced apart from the third tooth to define a second gap therebetween, wherein the third tooth and the fourth tooth project toward the flywheel;
a locking pin transitionable between:
a locked position in which the locking pin is disposed within the first gap and the second gap and abuts the first tooth, the second tooth, the third tooth, and the fourth tooth such that the flywheel does not rotate about the first longitudinal axis; and
an unlocked position in which the locking pin does not abut the first tooth and the second tooth such that the flywheel rotates about the first longitudinal axis,
wherein the locking pin includes a first seating surface that is substantially perpendicular to the second longitudinal axis;
a flange attached to the engine block and defining a channel therethrough along a second longitudinal axis that is substantially parallel to the first longitudinal axis;
wherein the flange has a first working surface and the locking pin has a second working surface that is spaced apart from the first working surface and the first seating surface;
a solenoid attached to the flange, wherein the solenoid includes:
a housing including a dividing member and defining a first chamber and a second chamber spaced apart from the first chamber by the dividing member;
a bobbin disposed within the first chamber and defining an internal cavity;
a coil disposed on and wound about the bobbin; and
a plunger translatable along the second longitudinal axis within the internal cavity;
a rod extending between the first chamber and the second chamber and abuttable with the plunger;
a seat abuttable with the rod and disposed within the second chamber, wherein the seat has a second seating surface that is substantially perpendicular to the second longitudinal axis and substantially parallel to the first seating surface;
a first resilient member disposed along the second longitudinal axis and disposed between and attached to the first seating surface and the second seating surface; and
a second resilient member disposed along the second longitudinal axis;
wherein the second resilient member is disposed between and attached to the first working surface and the second working surface along the second longitudinal axis.

9. A hybrid vehicle comprising:
a plurality of wheels each rotatable about an axle;
an internal combustion engine;
an automatic transmission operable in an electric mode in which the internal combustion engine does not rotate the plurality of wheels about the axle; and
an electric motor configured for rotating the plurality of wheels about the axle and operably connected to the automatic transmission;
wherein the internal combustion engine is operably connected to the automatic transmission and includes:
an engine block defining a bore therethrough along a first longitudinal axis;
a flywheel rotatable about the first longitudinal axis and including a first spline, wherein the first spline has a first tooth and a second tooth spaced apart from the first tooth to define a first gap therebetween; and
a grounding clutch coupled to the engine block and configured for preventing rotation of the flywheel about the first longitudinal axis when the automatic transmission operates in the electric mode, wherein the grounding clutch includes:
a locking pin transitionable between a locked position in which the locking pin is disposed within the first gap and abuts the first tooth and the second tooth such that the flywheel does not rotate about the first longitudinal axis, and an unlocked position in which the locking pin does not abut the first tooth and the second tooth such that the flywheel rotates about the first longitudinal axis;

wherein the locking pin includes a first seating surface that is substantially perpendicular to the second longitudinal axis;

a second spline having a third tooth and a fourth tooth spaced apart from the third tooth to define a second gap therebetween;

a flange attached to the engine block and defining a channel therethrough along a second longitudinal axis that is substantially parallel to the first longitudinal axis;

wherein the flange has a first working surface and the locking pin has a second working surface that is spaced apart from the first working surface and the first seating surface;

a solenoid attached to the flange, wherein the solenoid includes:
- a housing including a dividing member and defining a first chamber and a second chamber spaced apart from the first chamber by the dividing member;
- a bobbin disposed within the first chamber and defining an internal cavity;
- a coil disposed on and wound about the bobbin; and
- a plunger translatable along the second longitudinal axis within the internal cavity;

a rod extending between the first chamber and the second chamber and abuttable with the plunger;

a seat abuttable with the rod and disposed within the second chamber, wherein the seat has a second seating surface that is substantially perpendicular to the second longitudinal axis and substantially parallel to the first seating surface;

a first resilient member disposed along the second longitudinal axis and disposed between and attached to the first seating surface and the second seating surface; and a second resilient member disposed along the second longitudinal axis;

wherein the second resilient member is disposed between and attached to the first working surface and the second working surface along the second longitudinal axis.

* * * * *